United States Patent [19]
Kinoshita

[11] Patent Number: 5,735,364
[45] Date of Patent: Apr. 7, 1998

[54] LUBRICATING STRUCTURE FOR A WHEEL DRIVING APPARATUS

[75] Inventor: Yoichi Kinoshita, Kanagawa, Japan

[73] Assignee: Kabushiki Kaisha Komatsu Seisakusho, Tokyo, Japan

[21] Appl. No.: 454,140

[22] PCT Filed: Nov. 12, 1993

[86] PCT No.: PCT/JP93/01662

§ 371 Date: Jun. 8, 1995

§ 102(e) Date: Jun. 8, 1995

[87] PCT Pub. No.: WO94/13504

PCT Pub. Date: Jun. 23, 1994

[30] Foreign Application Priority Data

Dec. 10, 1992 [JP] Japan ............... 4-085068 U

[51] Int. Cl.⁶ .................................................. B60K 7/00
[52] U.S. Cl. .................................... 180/308; 180/253
[58] Field of Search ............................ 180/308, 253; 74/467, 713; 475/161

[56] References Cited

U.S. PATENT DOCUMENTS

| | | | |
|---|---|---|---|
| 3,439,766 | 4/1969 | Dence et al. | 180/308 |
| 4,442,729 | 4/1984 | Hayakawa | 74/467 |
| 4,468,981 | 9/1984 | Ries | 74/713 |
| 5,156,579 | 10/1992 | Wakuta et al. | 475/161 |
| 5,472,062 | 12/1995 | Nagi et al. | 180/308 |

FOREIGN PATENT DOCUMENTS

| | | | |
|---|---|---|---|
| 000562122 | 10/1992 | European Pat. Off. | 180/308 |
| 54-157932 | 12/1979 | Japan . | |
| 59-37429 | 10/1984 | Japan . | |
| 63-60765 | 4/1988 | Japan . | |
| 63-19215 | 5/1988 | Japan . | |
| 63-24846 | 5/1988 | Japan . | |
| 5-193373 | 8/1993 | Japan . | |
| WO93/08039 | 4/1993 | WIPO | 180/308 |

*Primary Examiner*—Brian L. Johnson
*Assistant Examiner*—Jonathan E. Butts
*Attorney, Agent, or Firm*—Wenderoth, Lind & Ponack

[57] ABSTRACT

A lubricating structure for a wheel driving apparatus in which a wheel hub (7) is rotatably supported by a wheel mounting body (1). An output side of a hydraulic motor (31) is attached to the mounting body and is coupled to a drive shaft (6) which is engageably inserted into a shaft bore (50) of the wheel mounting body. The drive shaft is coupled to the wheel hub via a reduction gear mechanism (10) and a clutch mechanism (11), and a braking mechanism (37) is mounted between the wheel hub and the wheel mounting body. The lubricating structure is characterized in that an annular space (51), formed between the shaft bore and the drive shaft, communicates via individual lubricable portions with a lubricant oil inlet (103) and a peripheral port (55). Also, the lubricant oil is supplied from the lubricant oil inlet and is discharged from the port.

12 Claims, 3 Drawing Sheets

5,735,364

1

LUBRICATING STRUCTURE FOR A WHEEL DRIVING APPARATUS

TECHNICAL FIELD

The present invention relates to a structure for lubricating each individual part of a wheel driving apparatus provided with a braking mechanism while coupling an output side of a hydraulic motor to a wheel via a reduction gear mechanism and a clutch mechanism.

BACKGROUND ART

In a wheel driving apparatus provided with a reduction gear mechanism, a clutch mechanism and a braking mechanism, there arises a need to be supplied with a lubricant oil for the purposes of lubricating and cooling each individual part therein.

To this end, it is conceivable that use is made of a conduit for connection to each of the decelerating mechanism, the clutch mechanism and the braking mechanism. This measure is, however, found to be disadvantageous in that an excessive number of conduits are required and a space for those conduits needs to be excessively enlarged.

The present invention has been made to obviate the conventional inconveniences mentioned above, and has an object of providing a lubricating structure for a wheel driving apparatus whereby those individual lubricable portions can be thoroughly lubricated and cooled only with a reduced number of conduits.

SUMMARY OF THE INVENTION

In order to achieve the foregoing and other objects, there is provided in accordance with the present invention and in one form thereof, a lubricating structure for a wheel driving apparatus in which a wheel hub on which a tire is mounted is rotatably supported by a wheel mounting body. An output side of a hydraulic motor that is attached to the rotary mounting body is coupled to a drive shaft which is engageably inserted into a shaft bore of the wheel mounting body. The drive shaft is coupled to the said wheel hub via a reduction gear mechanism and a clutch mechanism, and a braking mechanism is mounted between the wheel hub and the wheel mounting body.

The lubricating structure is characterized in that an annular space formed between the shaft bore and the drive shaft is communicated via individual lubricable portions with a lubricant oil inlet and a peripheral port, respectively. The lubricant oil is supplied from the lubricant oil inlet and is discharged from the port.

With the structure so constructed, the lubricant oil introduced into the annular space between the drive shaft and the shaft bore will be caused, by the action of a centrifugal force, to flow through those individual lubricable portions into the port and will then be discharge from the port. Accordingly, those individual lubricable portions can be thoroughly lubricated and cooled only with a reduced number of conduits.

In this connection, it should be noted that it is preferable that the above-mentioned lubricant oil inlet is formed in a cover having the afore-mentioned hydraulic motor attached thereto. Also, preferably, a gear containing portion should be provided between the afore-mentioned lubricant oil inlet and the afore-mentioned annular space.

Further, it is typical that the afore-mentioned wheel hub is supported by the afore-mentioned wheel mounting body via a bearing and that this bearing is located between the afore-mentioned annular space and the afore-mentioned port.

2

It is also preferable that the afore-mentioned braking mechanism should be positioned between the afore-mentioned annular space and the afore-mentioned port.

What is more, a discharging conduit should preferably be provided for connection with the afore-mentioned port.

The present invention also provides, in another form thereof, a lubricating structure for a wheel driving apparatus in which a wheel hub on which a tire is mounted is rotatably supported by a wheel mounting body. An output side of a hydraulic motor that is attached to the rotary mounting body is coupled to a drive shaft which is engageably inserted into a shaft bore of the wheel mounting body. The drive shaft is coupled to the wheel hub via a reduction gear mechanism and a clutch mechanism. And a braking mechanism is mounted between the wheel hub and the wheel mounting body.

The lubricating structure is characterized in that a first oil aperture is formed in a central side of the wheel mounting body, that the first oil aperture is communicated via a rotary sealing portion with a second oil aperture which is formed in the wheel hub, that the second oil aperture is communicated to a pressure receiving chamber of the clutch mechanism, that the rotary sealing portion is communicated with a peripheral port via the individual lubricable portions, and that a leakage oil from the rotary sealing portion is discharged from the port while a clutching purpose pressurized lubricant oil is supplied from the first oil aperture.

With the structure so constructed, because a portion of the clutching purpose pressurized oil adapted for switching on and off the clutch mechanism is leaked from the rotary sealing portion for passing through the individual lubricable portions to flow into the port and then to flow out from the port, only a reduced number of the conduits can be required to thoroughly lubricate and cool those individual lubricable portions.

In this connection, it is preferable that the wheel hub should be supported by the afore-mentioned wheel mounting body via a bearing and that this bearing should be located between the afore-mentioned rotary sealing portion and the afore-mentioned port.

In addition, the afore-mentioned braking mechanism should preferably be positioned between the afore-mentioned rotary sealing portion and the afore-mentioned port.

What is more, a discharging conduit should preferably be provided for connection with the afore-mentioned port.

The present invention further provides, in yet another form thereof, a lubricating structure for a wheel driving apparatus in which a wheel hub on which a tire is mounted is rotatably supported by a wheel mounting body. An output side of a hydraulic motor that is attached to the rotary mounting body is coupled to a drive shaft which is engageably inserted into a shaft bore of the wheel mounting body. The said drive shaft is coupled to the wheel hub via a reduction gear mechanism and a clutch mechanism, and a braking mechanism is mounted between the wheel hub and the wheel mounting body.

The lubricating structure is characterized in that an annular space formed between the shaft bore and the drive shaft is communicated via individual lubricable portions with a lubricant oil inlet and a peripheral port, respectively, and that the lubricant oil is supplied from the lubricant oil inlet and is discharged from the port.

Also a first oil aperture is formed in a central side of the wheel mounting body, that the first oil aperture is communicated via a rotary sealing portion with a second oil aperture which is formed in the wheel hub. The second oil aperture is communicated to a pressure receiving chamber of the clutch mechanism. The rotary sealing portion is communicated with the port via the individual lubricable portions. Also, a leakage oil from the rotary sealing portion is discharged from the port while a clutching purpose pressurized lubricant oil is supplied from the first oil aperture.

In this connection, it is preferable that the wheel hub should be supported by the afore-mentioned wheel mounting body via a bearing and that this bearing should be located between the afore-mentioned rotary sealing portion and the afore-mentioned port.

In addition, the afore-mentioned braking mechanism should preferably be positioned between the afore-mentioned rotary sealing portion and the afore-mentioned port.

What is more, a discharging conduit should preferably be provided for connection with the afore-mentioned port.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

DETAILED DESCRIPTION OF THE INVENTION

Hereinafter, a lubricating structure for a wheel driving apparatus according to the present invention will be described, first with respect to a first embodiment thereof with reference to FIG. 1.

Figure 1:
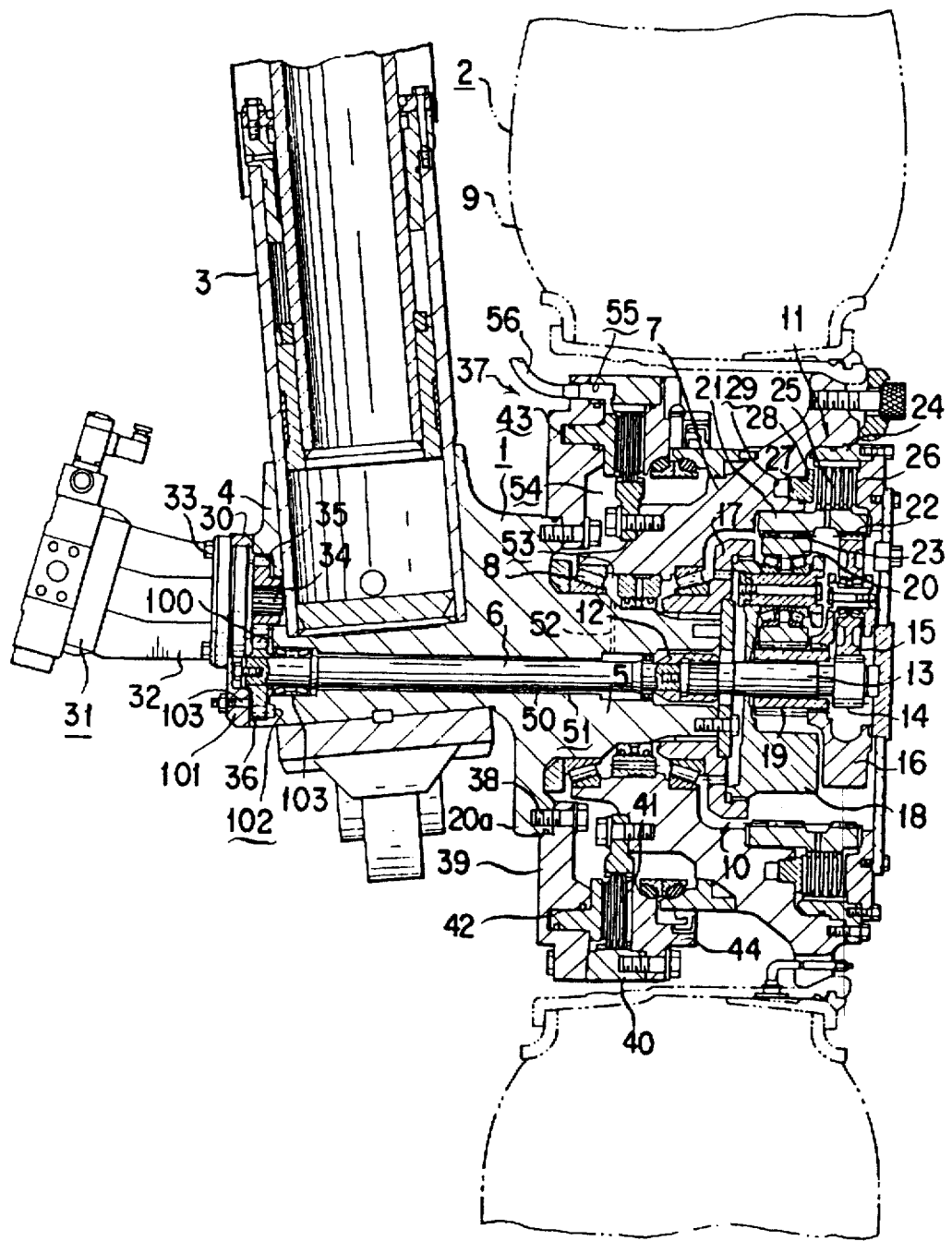
FIG. 1 is a cross-sectional view illustrating a first embodiment of the lubricating structure for a wheel driving apparatus according to the present invention.

As shown in FIG. 1, a wheel 2 is mounted on a wheel mounting body 1 which is supported so as to be capable of rocking up and down through a suspension cylinder 3 on an automobile body not shown. The wheel 2 is thus made as capable of being steered leftwards and rightwards relative to the mobile body.

The afore-mentioned wheel mounting body 1 comprises a mounting base 4 and a cylindrical supporting shaft portion 5 which is directed leftwardly and rightwardly. A drive shaft 6 is rotatably inserted into and supported by the supporting shaft portion 5. A wheel hub 7 is rotatably supported via a bearing 8 on the peripheral surfaces of the supporting shaft portion 5. A tire 9 is mounted on the wheel hub 7 so as to construct the wheel 2. And, one end of the afore-mentioned drive shaft 6 and the wheel hub 7 are coupled together via a reduction gear mechanism 10 of a planetary gear type and a clutch mechanism 11.

The afore-mentioned reduction gear mechanism 10 comprises: an input shaft 13 that is connected via a coupling 12 to the afore-mentioned drive shaft 6; a first sun gear 14 that is integrally mounted on the input shaft 13; a first planetary gear 15 that is threadedly engaged with the first sun gear 14; a first carrier 16 that is arranged to support the first planetary gear 15; a fixed ring gear 17 that is coupled in a spline engagement with an end portion of the supporting shaft portion 5 of the afore-mentioned wheel mounting body 1; a second carrier 18 that is coupled in a spline engagement with the fixed ring gear 17; a second planetary gear 20 that is pivotally supported on the second carrier 18; a second sun gear 19 that is rotatably supported by the input shaft 13 and is threadedly engaged with the planetary gear 20; and a cylindrical drive body 21 that is rotatably supported in the afore-mentioned wheel hub 7. The afore-mentioned first and second planetary gears 15 and 20 are threadedly engaged respectively with a first and a second inner tooth 22 and 23 formed in the cylindrical drive body 21 while the first carrier 16 is threadedly engaged with the second sun gear 19 so as to form a two gear ratios reduction gear mechanism.

In the afore-mentioned clutch mechanism 11, a drive clutch plate 25 and a follower clutch plate 26 are mounted in a spline engagement alternately on a cylindrical follower body 24 that is bolted to the wheel hub 7 and on the afore-mentioned cylindrical drive body 21 so that the follower clutch plate 26 may be urged to contact the drive clutch plate 25 by means of a piston 27. The piston 27 is ring shaped in order to be engageably inserted into an annular recess 28 of the wheel hub 7, thereby forming a pressure receiving chamber 29. When the pressure receiving chamber 29 is supplied with a pressurized oil, the piston 27 will be extended to urge into contact the drive clutch plate 25 and the follower clutch plate 26 with each other so as to transfer a rotation of the drive shaft 6 to the wheel hub 7. When the pressurized oil in the pressure receiving chamber 29 is being discharged, the piston 27 will be retracted so that the afore-mentioned drive clutch plate 25 and follower clutch plate 26 may be removed away from each other so as to make discontinuous a reduction gear mechanism 10 that is mounted on the drive shaft 6 and the afore-mentioned wheel hub 7. When this discontinuous condition is developed at the time of high speed traveling of the mobile, the reduction gear mechanism 10 will not be rotated with any rotation of the wheel 2. Thus, the various individual portions in the reduction gear mechanism can be prevented from any abnormal wear.

In the region of an end surface 30 which is opposite to the side of the mounting base 4 of the afore-mentioned wheel mounting body 1, relative to the wheel 2 there is disposed a hydraulic motor 31 whose motor body 32 is secured to the end surface 30 by means of bolts 33. The hydraulic motor 31 has its rotary axis 34 coupled to the drive shaft 6 via a first gear 35 and a second gear 36.

More specifically, the wheel mounting body 1 is formed with a shaft bore 50 by which the supporting shaft portion 5 and the mounting base 4 are penetrated. The end surface 30 of the mounting base 4 is formed with a recess 100 whereas a cover 101 is bolted to form a gear containing portion 102 which is continuous with the shaft bore 50. The gear containing portion 102 is provided with the first gear 35 and the second gear 36 whereas the cover 101 has the hydraulic motor body 32 secured thereto.

Also, a braking mechanism 37 is provided between the afore-mentioned supporting shaft portion 5 and wheel hub 7. The braking mechanism 37 is provided with one end plate 39 which is coupled by bolts 38 to an outwardly oriented flange 20a of the supporting shaft portion 5. The afore-mentioned one end plate 39 has a cylindrical body 40 attached thereto which is in turn secured to the other end plate 44. A plurality of braking disks 41 are mounted with alternate spline engagement to the cylindrical body 40 and the wheel hub 7, respectively. By operating a piston 42 with the pressurized oil in the oil chamber 43, the braking disks 41 are thrust into contact with the other end plate 44. Thus, the wheel hub 7 is braked by so thrusting into contact the braking disks 41 with each other.

Next, the lubrication of the individual portions will be described below.

The cover 101 for mounting the afore-mentioned motor body 32 thereon is formed with a lubricant oil inlet 103, which is open to the gear containing portion 102 of the wheel mounting body 1 and is communicated with an annular space 51 formed by the shaft bore 50 and the drive shaft 6. This annular space 51 communicates with an annular space 53 between the supporting shaft portion 5 and the wheel hub 7 via the oil aperture 52 extending in a radial direction of the supporting shaft 5. The annular space 53 communicates through the bearing 8 with a space 54 between the wheel hub 7 and the one end plate 39. The space 54 in turn communicates through between the braking disks 41 of the braking mechanism 39 with a peripheral port 55, which is connected to the discharging conduit 56. The afore-mentioned inlet 103 for the lubricant oil is connected to a lubricant oil supply conduit not shown.

With the structure so constructed, a lubricant oil introduced from the lubricant oil inlet 103 will flow into the annular space 51 from the gear containing portion 102. In this state, the first and second gears 35 and 36, and a bearing 103 will be lubricated. Further, by the action of a centrifugal force, the lubricant oil will flow through the oil aperture 52, the annular space 53, the space 54 and the gaps between the braking disks 41 into the port 55 and then will flow out into a discharging conduit 56 from the port 55. The individual parts will thus be thoroughly lubricated and cooled.

As has been set forth in the foregoing, the lubricant oil introduced into the annular space 52 formed by the drive shaft 6 and the shaft bore 50 will by the action of a centrifugal force, to flow through those individual lubricable portions into the port 55 and will then be discharge from the port 55 into the discharging conduit 56. Accordingly, those individual lubricable portions can be thoroughly lubricated and cooled with a reduced number of conduits.

Next, reference is made to a second embodiment of the present invention.

Figure 2:
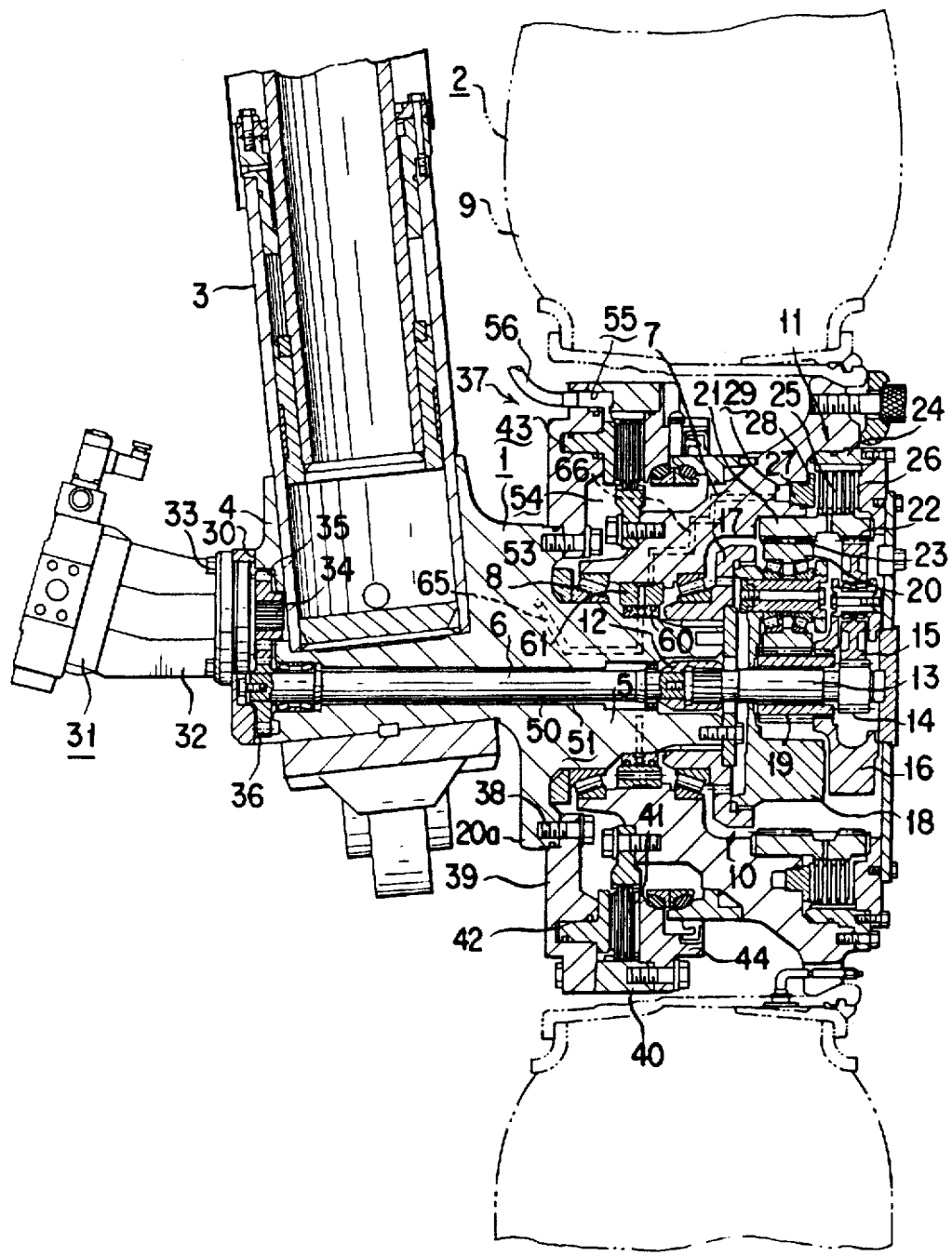
FIG. 2 is a cross-sectional view illustrating a second embodiment of the lubricating structure for a wheel driving apparatus according to the present invention.
Figure 3:
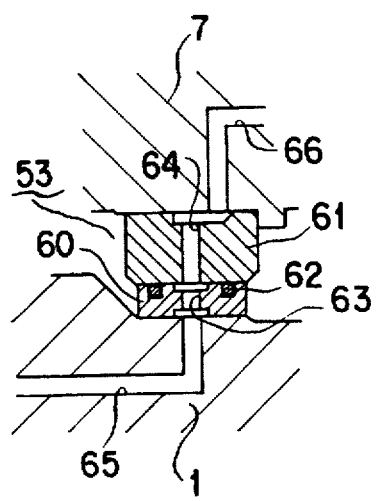
FIG. 3 is an enlarged cross-sectional view of the collar portion in FIG. 2.

As shown in FIG. 2, the peripheral surface of the afore-mentioned supporting shaft portion 5 is engaged with a first collar 60 whereas a second collar 61 is engaged between the first collar 60 and the inner surface of the wheel hub 7. As shown in FIG. 3, the first collar 60 has attached thereto a seal member 62 such as to seal the engagement portion between the first collar 60 and the second collar 61.

The afore-mentioned first and second collars 60 and 61 are formed with oil apertures 63 and 64, respectively. The oil aperture 63 of the first collar 60 communicates with an output side of a clutch valve not shown via an oil aperture 65 of the wheel mounting body 1, whereas the oil aperture 64 of the second collar 61 communicates with the pressure receiving chamber 29 of the afore-mentioned clutch mechanism 11 via an oil aperture 66 of the wheel hub 7. A portion of the pressurized oil for clutching purposes which is supplied under pressure from a clutch valve will be leaked at the engagement portion between the first and second collars 60 and 61, that is, from the rotary sealing portion to flow into the afore-mentioned annular space 53; then, by action of a centrifugal force, to flow through and thereby lubricate various individual parts similarly as mentioned above; and finally to flow out from the peripheral port 55 into the discharging conduit 56.

As has been set forth in the foregoing, there is hereby provided a lubricating structure for a wheel driving apparatus in which a portion of the clutching purpose pressurized oil for switching on and off the clutch mechanism 11 is leaked from the rotary sealing portion so as to flow through various individual lubricable portions into the port 55 and then to flow out from the port 55 into the discharging conduit 56. Accordingly, those lubricable portions can be thoroughly lubricated and cooled with a reduced number of conduits.

In connection with the above, it should also be noted that there may be constructed, in accordance with the present invention, a lubricating structure that is provided with both aspects of the foregoing first and second embodiments thereof.

While the present invention has hereinbefore been described with respect to certain illustrative embodiments thereof, it will readily be appreciated by those skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

INDUSTRIAL APPLICABILITIES

As has been described hereinbefore, it will be understood that a lubricating structure for a wheel driving apparatus according to the present invention is extremely useful in the lubrication of various parts in a wheel driving apparatus such as in a dump car.

I claim:

1. A lubricating structure for a wheel driving apparatus, said lubricating structure comprising:

a wheel mounting body rotatably supporting a wheel hub on which a tire can be mounted;

a shaft bore formed in said wheel mounting body;

a drive shaft inserted in said shaft bore such that an annular space is formed between an inner peripheral surface of said shaft bore and said drive shaft, said drive shaft being coupled to said wheel hub via a reduction gear mechanism and a clutch mechanism;

a hydraulic motor attached to said wheel mounting body and having an output side coupled to said drive shaft;

a braking mechanism mounted between said wheel hub and said wheel mounting body, wherein said annular space communicates with a lubricant oil inlet and a peripheral port via individual lubricable portions, and a lubricant oil is supplied from said lubricant oil inlet and is discharged from said peripheral port; and a discharging conduit connected to said peripheral port.

2. The lubricating structure as claimed in claim 1, further comprising:

a cover attached to said hydraulic motor, said cover having said lubricant oil inlet formed therein; and a gear containing portion provided between said lubricant oil inlet and said annular space formed between said drive shaft and said shaft bore.

3. The lubricating structure as claimed in claim 1, further comprising a bearing disposed between said wheel hub and said wheel mounting body, wherein said bearing is located between said annular space and said peripheral port.

4. The lubricating structure as claimed in claim 1, wherein said braking mechanism is located between said annular space and said peripheral port.

5. A lubricating structure for a wheel driving apparatus, said lubricating structure comprising:

a wheel mounting body rotatably supporting a wheel hub on which a tire can be mounted, said wheel mounting body defining a shaft bore therein;

a first oil aperture formed in a central side of said wheel mounting body;

a second oil aperture formed in said wheel hub;

a drive shaft engageably inserted in said shaft bore, said drive shaft being coupled to said wheel hub via a reduction gear mechanism and a clutch mechanism having a pressure receiving chamber;

a hydraulic motor attached to said wheel mounting body and having an output side coupled to said drive shaft; and a braking mechanism mounted between said wheel hub and said wheel mounting body, wherein said first oil aperture communicates with said second oil aperture via a rotary sealing portion, said second oil aperture communicates with said pressure receiving chamber of said clutch mechanism, said rotary sealing portion communicates with a peripheral port via individual lubricable portions, and leakage oil from said rotary sealing portion is discharged from said port while a clutching purpose pressurized lubricant oil is supplied from said first oil aperture.

6. The lubricating structure as claimed in claim 2, further comprising a bearing disposed between said wheel hub and said wheel mounting body, wherein said bearing is located between said rotary sealing portion and said port.

7. The lubricating structure as claimed in claim 5, wherein said breaking mechanism is located between said rotary sealing portion and said port.

8. The lubricating structure as claimed in claim 5, further comprising a discharging conduit connected to said port.

9. A lubricating structure for a wheel driving apparatus, said lubricating structure comprising:

a wheel mounting body rotatably supporting a wheel hub on which a tire can be mounted, said wheel mounting body defining a shaft bore therein;

a first oil aperture formed in a central side of said wheel mounting body;

a second oil aperture formed in said wheel hub;

a drive shaft inserted in said shaft bore so as to define an annular space between an inner peripheral surface of said shaft bore and said drive shaft, said drive shaft being coupled to said wheel hub via a reduction gear mechanism and a clutch mechanism having a pressure receiving chamber;

a hydraulic motor attached to said wheel mounting body and having an output side coupled to said drive shaft; and a braking mechanism mounted between said wheel hub and said wheel mounting body, wherein said annular space communicates with a lubricant oil inlet and a peripheral port via individual lubricable portions, a lubricant oil is supplied from said lubricant oil inlet and is discharged from said peripheral port, said first oil aperture communicates via a rotary sealing portion with said second oil aperture, said second oil aperture communicates with said pressure receiving chamber of said clutch mechanism, said rotary sealing portion communicates with said peripheral port via individual lubricable portions, and leakage oil from said rotary sealing portion is discharged from said peripheral port while a clutching purpose pressurized lubricant oil is supplied from said first oil aperture.

10. The lubricating structure as claimed in claim 9, further comprising a bearing disposed between said wheel hub and said wheel mounting body, wherein said bearing is located between said rotary sealing portion and said port.

11. The lubricating structure as claimed in claim 9, wherein said braking mechanism is located between said rotary sealing portion and said port.

12. The lubricating structure as claimed in claim 9, further comprising a discharging conduit connected to said port.

* * * * *